Figures 1, 2:
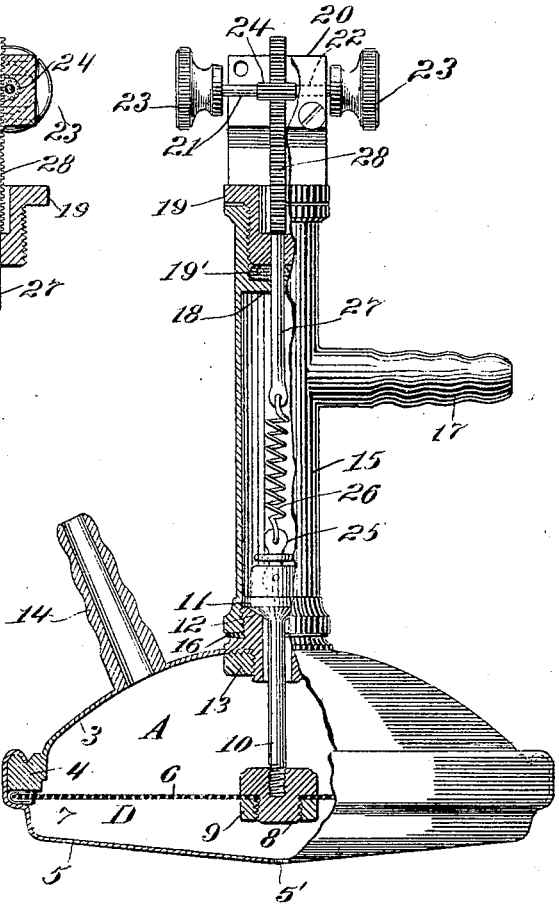

No. 774,340. PATENTED NOV. 8, 1904.
G. G. SMITH.
PRESSURE REGULATING VALVE.
APPLICATION FILED NOV. 21, 1901.
NO MODEL.

Witnesses
Robert Head
F. E. Maynard

Inventor:
George Gregory Smith
By his Attorney,
F. H. Richards.

No. 774,340. Patented November 8, 1904.

UNITED STATES PATENT OFFICE.

GEORGE GREGORY SMITH, OF FLORENCE, ITALY.

PRESSURE-REGULATING VALVE.

SPECIFICATION forming part of Letters Patent No. 774,340, dated November 8, 1904.

Application filed November 21, 1901. Serial No. 83,079. (No model.)

*To all whom it may concern:*

Be it known that I, GEORGE GREGORY SMITH, a citizen of the United States, residing in Villa Bel Reposo, San Domenico, Florence, Italy, have invented certain new and useful Improvements in Pressure - Regulating Valves, of which the following is a specification.

This invention relates to a regulating-valve, and has for its object to provide a valve for adjustably and automatically regulating the flow of fluids.

Another object of the invention is to regulate the supply of fluids from a higher to a lower pressure, as may be desired.

A further object of the invention is to provide means for regulating the volume of fluid delivered at a given point, which would otherwise be delivered to such point at too great pressure or with variation of pressure.

Another object of the invention is to provide adjustable means for automatically regulating the amount of fluid supplied to equal the amount required under varying conditions.

In carrying out my invention I employ some suitable means which may be regulated to permit the minimum pressure of fluid which it is desired to utilize to freely pass from the source of supply to the point of utilization, and upon more pressure being exerted than the predetermined minimum the supply will be cut off or impeded to permit the excess of pressure to be utilized, and upon the restoration of equilibrium the supply will continue. If more fluid is used than the predetermined minimum of pressure, the amount of supply permitted to pass will be increased sufficiently to meet the new conditions at the point of utilization.

One means of carrying out my invention is to employ a valve capable of movement toward or from its seat by the pressure of the fluid which has passed the valve by a diaphragm, the chamber in which the diaphragm is located being in communication with the point at which the fluid is to be utilized, the communication from the source of supply being on the side of the valve opposite the diaphragm. The pressure of fluid in the chamber above the diaphragm, if in excess of the amount which is being utilized, will act upon the diaphragm and seat the valve and hold it seated against further flow of fluid until the excess or surplus in the chamber has been drawn off, when the diaphragm will move toward its normal position and permit the valve to unseat, and if fluid in excess of the minimum pressure is withdrawn the valve will be further opened and permit the passage of more fluid. A suitable spring or weight adjustable, if desired, may be employed in connection with the valve or diaphragm by which the amount of fluid passing the valve may be regulated. By such regulation the device may be balanced so that excess of pressure will disturb the balance and seat the valve. Upon the restoration of the balance the flow of fluid will again be permitted, and reduction of pressure on the diaphragm will move the valve a greater distance from its seat. Thus the valve will seat upon the introduction into the chamber of a predetermined pressure of fluid irrespective of the voluminousness of the supply or the variance in pressure from the source of supply. If, however, the pressure of the supply is equaled by the consumption, the valve which has been adjusted for the minimum of such requirements of consumption will remain open. By use of this device pressure of various fluids supplied from one point to another may be regulated to the varying needs. If the source of supply is varying as to pressure and it is desired to have fluid at a constant pressure delivered at the point of utilization, by the adjustment of the valve the variations from the source of supply will not be felt at the point of utilization, and if the source of supply stands ready to deliver to the point of utilization a volume of fluid at a pressure much in excess of that which is needed for use the valve may be adjusted to deliver to the point of utilization the required quantity of fluid, whereupon the voluminousness of the supply will not be felt at the point of utilization, thus giving efficient results. If, for instance, it is desired to use the device in connection with gas-supply, the amount delivered to the burners may be regulated to meet the requirements, and if the device is used in connection with acetylene-gas generators the intermittent generation of gas will not be felt at the burners, and the use of more burners than the minimum will not affect the pressure at the individual burners.

In the drawings accompanying and forming a part of this specification, Figure 1 is a side view, partly broken away, of a form of my invention. Fig. 2 is a vertical sectional view of the upper portion of Fig. 1 and at right angles thereto.

The chamber (designated in a general way by A) is shown as embodying an upper wall 3, having a ring 4, to which the upper wall is secured, and a lower wall or bottom 5, bent or spun over the ring, interposed between which ring and bottom portion is a diaphragm (designated in a general way by D) constituting a disk 6, made of some resilient material and packed fluid-tight by means of some packing 7. In the center of the disk is secured a block 8, fastened in place by a suitable nut 9 and having projecting upwardly therefrom a valve-stem 10, which may be screwed into the block, if desired, the upper end of the valve-stem carrying a valve 11, provided with a suitable seat 12, which is located at the top of the chamber and secured in place by means of a nut 13. The chamber is provided with a connection 14, capable of connection with the source of utilization of the fluid. Secured above the valve-seat is a chamber 15, comprising a tubular body screw-threaded upon the outside of the valve-seat and having suitable packing material 16 interposed between its end and a shoulder on the valve-seat, such chamber being provided with a connection 17, capable of attachment to some source of fluid-supply. The upper part of the chamber 15 is provided with a ledge 18, above which is screwed a gland 19, between which ledge and gland some suitable packing material 19' may be inserted. Projecting upwardly from the gland is a head 20, carrying a shaft 21, having suitable journals 22, each end of the shaft being provided with a knurled head 23, such shaft carrying in the center portion a pinion 24. The upper end of the valve is provided with a link 25, to which link is attached a spiral spring 26. Passing from the gland or stuffing-box is a rod 27, connected to such spring and provided at its upper end with a rack 28 in mesh with the pinion, by means of which rack and pinion the resiliency of the diaphragm may be controlled, as will be obvious. An opening 5' is made in the wall 5.

The operation of the device is as follows: The fluid introduced through the supply-pipe 17 forms a constant pressure upon the diaphragm, which throws the valve closed, so that no more fluid can enter beyond a sufficient quantity to overcome the resiliency of the flexible diaphragm. The object of the spring now becomes apparent. By turning the pinion so as to bring the spring into tension it will be seen that the initial pressure of the fluid can be exactly balanced, so that there will be little or no pressure whatever of the valve upon its seat. It will now be seen that if a portion of the fluid be drawn off the pressure upon the diaphragm, held in equilibrium by its own resilience added to that of the adjustable spring before referred to, will be reduced, and the valve will be thrown off its seat and more fluid will be allowed to enter. As the exit-pipe is opened more and more it follows that the pressure above the diaphragm will become less and less, the valve will be thrown more and more open, and a larger quantity of fluid allowed to enter and escape. In the case of gas—for instance, say, with a pressure of three inches water-column—the valve is brought into equilibrium by turning the pinion until the valve simply remains closed. Thus if the burners in connection with the exit-tube be opened—say one burner at a time—a small decrease of pressure will be caused in the interior of the chamber A, and the valve will be raised slightly off from its seat and permit just enough gas to escape, which will be regulated by the equilibrium established between the resilience of the elastic diaphragm and the spiral spring in the tube above. If another burner be opened, the pressure will be still lessened and a greater quantity of gas will be allowed to pass.

For the purpose of protection against accidents the metal casing or bottom 5 is made below the diaphragm, which has a hole or holes 5' for admission of air, so that there will always be a normal air-pressure below the flexible diaphragm. The only variation that there will be in this pressure will be due to barometric pressures, so that once having established an equilibrium between the diaphragm, the fluid-pressure, and the spiral spring the valve will seldom or never need adjustment except to conform to such barometric pressures as may exist at a given time. The valve can also be used as a pressure-reducer for any other fluid than gas.

Having described my invention, I claim—

1. In a pressure-regulator, the combination of an inlet-chamber open to the fluid-supply, an outlet-chamber from which the fluid is delivered, a diaphragm exposed on one side to atmospheric pressure and on the other side to the pressure within the outlet-chamber, a controlling-valve carried by the diaphragm and interposed between the two chambers, and an adjusting device comprising a tension-spring.

2. In a pressure-regulator, the combination of an inlet-chamber open to the fluid-supply, an outlet-chamber from which the fluid is delivered, a diaphragm, a self-centering valve carried by the diaphragm and free to adjust itself laterally to coöperate with its seat in response to the action of the diaphragm, said valve being interposed between said chambers, and an adjusting device.

3. In a pressure-regulator, the combination of an inlet-chamber open to the fluid-supply; an outlet-chamber from which the fluid is delivered; a diaphragm; a valve carried by the diaphragm and interposed between the two chambers; a spring for adjusting the valve; and a link connection between the spring and the valve.

4. In a pressure-regulator, the combination of an inlet-chamber open to the fluid-supply; an outlet-chamber from which the fluid is delivered; a diaphragm; a controlling-valve carried by the diaphragm and interposed between the two chambers; an adjusting-spring; a link connection between the spring and the valve; a slide-bar connection to said spring and formed with a rack; and a pinion engaging with the rack.

5. In a pressure-regulator, the combination of an inlet-chamber open to the fluid-supply; an outlet-chamber from which the fluid is delivered; a diaphragm; a controlling-valve carried by the diaphragm and free to adjust itself laterally to coöperate with its seat in response to the action of the diaphragm; an adjusting-spring; a slide-bar connecting the said spring and formed with a rack; and a pinion engaging with the rack.

6. In a pressure-regulator, the combination of an inlet-chamber open to the fluid-supply; an outlet-chamber from which the fluid is delivered; a diaphragm; a controlling-valve carried by the diaphragm and free to adjust itself laterally in response to the action of the diaphragm; a tension-spring for adjusting the valve; a link connection between the spring and the valve; a slide-bar connected to said spring and formed with a rack; and a pinion engaging with the rack.

7. In a pressure-regulator, the combination of an inlet-chamber open to the fluid-supply, an outlet-chamber from which the fluid is delivered, a diaphragm, a valve carried by the diaphragm and free to adjust itself laterally to coöperate with its seat in response to the action of the diaphragm, said valve being interposed between said chambers, a slide-bar, a stuffing-box through which said slide-bar extends, means for adjusting the slide-bar, and a spring connecting the valve with the slide-bar.

8. In a pressure-regulator, the combination of an inlet-chamber open to the fluid-supply; an outlet-chamber from which the fluid is delivered; a diaphragm; a valve carried by the diaphragm and free to adjust itself laterally to coöperate with its seat in response to the action of the diaphragm; a slide-bar; a stuffing-box through which the slide-bar extends; means for adjusting the slide-bar; and a tension-spring interposed between said slide-bar and said valve.

9. The combination of a casing; a diaphragm extending thereacross; a fluid-outlet for said casing and open to the space on one side of said diaphragm; a pressure-chamber erected on said casing above said diaphragm; a controlling-valve secured to said diaphragm; a slide-bar shiftable through said pressure-chamber; a stuffing-box through which said slide-bar extends; a rack on the upper end of the bar; a pinion engaging with said rack; a tension-spring connecting said slide-bar with said valve; and a link connection between the valve and the spring.

10. In a pressure-regulator, the combination of an inlet and an outlet chamber; a diaphragm constituting a portion of the wall of the former; an intervening controlling-valve carried by the diaphragm; an adjusting device comprising a tension-spring; and a link connection between the spring and the valve.

11. In a pressure-regulator, the combination of inlet and outlet chambers; a diaphragm constituting a portion of the walls of the former; an intervening controlling-valve free to adjust itself laterally to coöperate with its seat in response to the action of the diaphragm; an adjusting device comprising a tension-spring; and a link connection between the spring and the valve.

12. In a pressure-regulator the combination of an inlet and an outlet chamber, a diaphragm constituting a portion of the wall of the outlet-chamber, a valve-seat between such chambers, a controlling-valve carried by the diaphragm and free to adjust itself to coöperate with said seat in response to the action of the diaphragm, an adjusting device comprising a tension member, and a laterally-movable connection between the member and the valve.

GEORGE GREGORY SMITH.

Witnesses:
CHAS. LYON RUSSELL,
R. W. PITTMAN.